United States Patent [19]

Roethlingshoefer et al.

[11] Patent Number: 6,021,674
[45] Date of Patent: Feb. 8, 2000

[54] PRESSURE SENSOR HAVING AT LEAST ONE CONNECTOR ELEMENT ARRANGED FLUSH WITH A MOUNTING SURFACE AND A CAPILLARY ADHESIVE LAYER ARRANGED BETWEEN A SUPPORT PLATE AND THE MOUNTING SURFACE

[75] Inventors: Walter Roethlingshoefer, Reutlingen; Kurt Weiblen, Metzingen; Ulrich Goebel, Reutlingen, all of Germany

[73] Assignee: Robert Bosch GmbH, Stuttgart, Germany

[21] Appl. No.: 08/973,123

[22] PCT Filed: Dec. 2, 1996

[86] PCT No.: PCT/DE96/02301

§ 371 Date: Dec. 1, 1997

§ 102(e) Date: Dec. 1, 1997

[87] PCT Pub. No.: WO97/37204

PCT Pub. Date: Oct. 9, 1997

[30] Foreign Application Priority Data

Apr. 1, 1996 [DE] Germany .............. 196 12 964

[51] Int. Cl.⁷ .................................................. G01L 7/00
[52] U.S. Cl. ................................................... 73/756
[58] Field of Search .............................. 73/708, 717, 718, 73/719, 720, 721, 726, 727, 756; 338/3, 4, 5, 42

[56] References Cited

U.S. PATENT DOCUMENTS

| | | | |
|---|---|---|---|
| 4,295,117 | 10/1981 | Lake et al. ................... | 73/721 |
| 4,675,643 | 6/1987 | Tanner et al. ................. | 338/4 |
| 4,735,098 | 4/1988 | Kavli et al. ................... | 73/708 |
| 5,257,547 | 11/1993 | Boyer .......................... | 73/756 |

*Primary Examiner*—William Oen
*Attorney, Agent, or Firm*—Kenyon & Kenyon

[57] ABSTRACT

A pressure sensor includes a housing, a support plate arranged on a mounting surface of the housing, a sensor element arranged in the housing, and at least one connector element joined in electrically conductive fashion to at least one contact surface of the support plate. A method for manufacturing a pressure sensor in such a way that the pressure sensor on the one hand can be manufactured easily and on the other hand is resistant to malfunction and is operational over a long period of time. The at least one connector element is arranged flush with the mounting surface and joined directly to the at least one contact surface. A capillary adhesive layer is arranged between the support plate and the mounting surface.

8 Claims, 3 Drawing Sheets

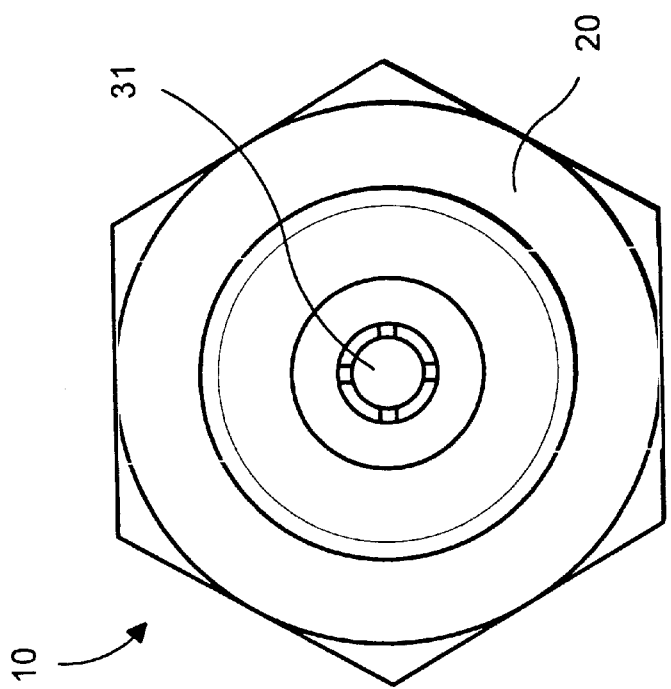
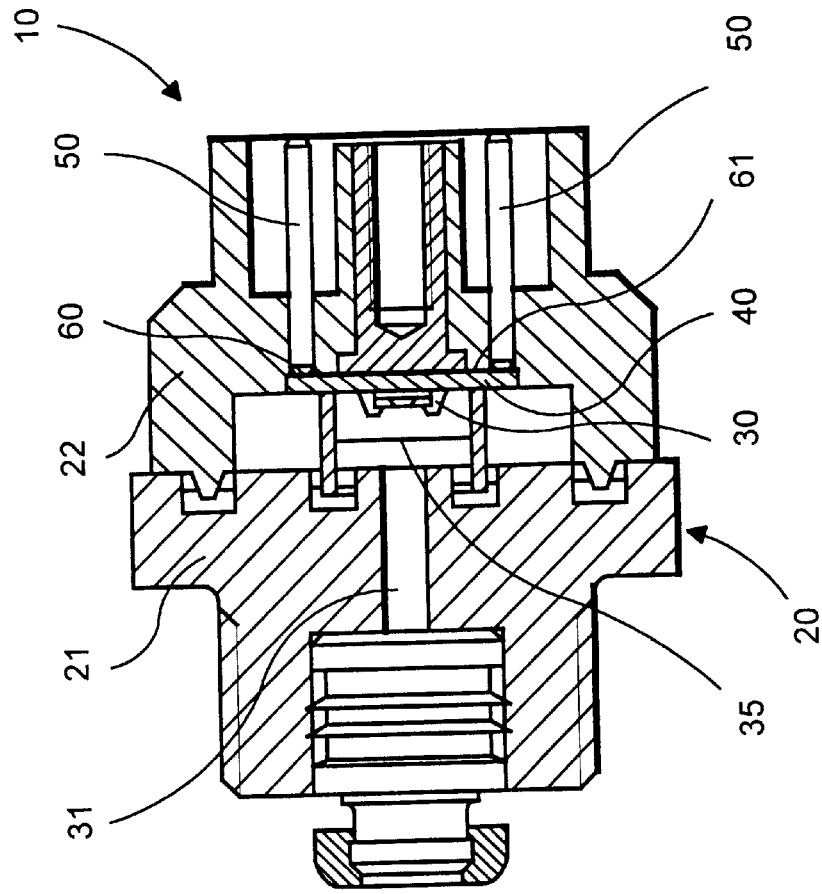

6,021,674

PRESSURE SENSOR HAVING AT LEAST ONE CONNECTOR ELEMENT ARRANGED FLUSH WITH A MOUNTING SURFACE AND A CAPILLARY ADHESIVE LAYER ARRANGED BETWEEN A SUPPORT PLATE AND THE MOUNTING SURFACE

FIELD OF THE INVENTION

The present invention relates to concerns a pressure sensor comprising a housing, a support plate arranged on a mounting surface of the housing, a sensor element arranged in the housing, and at least one connector element joined in electrically conductive fashion to at least one contact surface of the support plate.

German Patent No. DE 43 13 312 A1. In the case of this pressure sensor, the electrical connector elements and the support plate with electrical/electronic components located on it, as well as a sensor element, are each arranged separately in the housing. The pressure sensor, support plate, and electrical connector elements are each joined to one another in electrically conductive fashion by means of bonded wires.

The above described pressure sensor has the disadvantage, on the one hand, that manufacture is comparatively complex, since the electrical connector elements, the support plate, and the sensor element must each be arranged separately in the housing. On the other hand, contacting by means of bonded wires proves to be particularly disadvantageous specifically for a pressure sensor, since bonded wires of this kind are very sensitive, so that—in particular in the case of exposure to a medium under pressure—there exists the risk of damage to and thus destruction of the pressure sensor.

SUMMARY OF THE INVENTION

It is therefore an object of the present invention to develop a pressure sensor of this kind in such a way that it is not only easy to manufacture, but also exhibits very good resistance to malfunction and, as a consequence thereof, very high reliability even over a long period of time.

This is achieved according to the present invention, by the fact that the at least one connector element is arranged flush with the mounting surface, is joined directly to the at least one contact surface, and a capillary adhesive layer is arranged between the support plate and the mounting surface.

The arrangement of the at least one connector element flush with the mounting surface, and directly contacting with the at least one contact surface of the support surface, has the particularly great advantage that absolutely no sensitive bonded wires need to be provided in order to join the connector elements to the support plate, thus not only substantially simplifying manufacture, but moreover also increasing resistance to malfunction and, as a consequence thereof, operability over a long period of time.

The arrangement of a capillary adhesive layer between the support plate and the mounting surface has the great advantage of making possible, as it were, "one-piece" joining of the support plate to the mounting surface and thus the housing. Said capillary adhesive layer improves, in particular, the stability of the join between the support plate and the mounting surface, i.e. the housing, and thus also constitutes protection for the joins between the contact surfaces and the connector elements. The use of a capillary adhesive for this adhesive layer has the great advantage that said capillary adhesive flows into the tiniest pores between the mounting surface and the support plate, thus producing a particularly solid "monolithic" join.

With regard to joining of the connector elements and the contact surface, a wide variety of embodiments is conceivable. For example, provision can be made for the join between the connector elements and the contact surfaces to be a solder join.

In addition, an adhesive join can also be provided, in which case a conductive adhesive is used to make the join.

In both cases, the contact surfaces, which in most cases are printed, can thus be joined to the connector elements by means of SMD technology.

It is particularly advantageous that the capillary adhesive surrounds the electrically conductive join between the connector elements and the contact surfaces, and seals it against the environment. This not only—as already mentioned above—increases stability and reduces the (shear) forces acting on the join between the contact surfaces and the connector elements, but at the same time also protects the joins between the connector elements and the contact surfaces from environmental influences such as, for example, corrosion, oxidation, and the like.

In purely theoretical terms, the housing can consist of any material. Preferably, however, the housing is a plastic housing whose coefficient of thermal expansion is adapted in at least one direction of the mounting surface to that of the support plate. A plastic housing is not only easy and economical to manufacture, but with a plastic housing of this kind it is also possible, by utilizing the anisotropy of the expansion coefficient, to create a housing that is adapted specifically to the support, and in particular to its expansion coefficient.

The support plate is preferably a hybrid ceramic plate on which the sensor element is arranged, for example again by means of SMD technology. This decreases the total component complexity for arranging the sensor in the housing.

The present invention also provides a method for manufacturing a pressure sensor comprising a housing, a support plate arranged on a mounting surface of the housing, a sensor element arranged in the housing, and at least one connector element joined in electrically conductive fashion to at least one contact surface of the support plate, in which first the at least one contact surface is joined in directly conductive fashion to a connector element that is arranged flush with the mounting surface, and in which then a capillary adhesive is applied between the support plate and the mounting surface to form a sealing adhesive join.

BRIEF DESCRIPTION OF THE DRAWINGS

In the drawings:

FIG. 3 shows a partly sectioned front and side view of a further embodiment of a pressure sensor according to the invention.

DETAILED DESCRIPTION

Figure 1A:
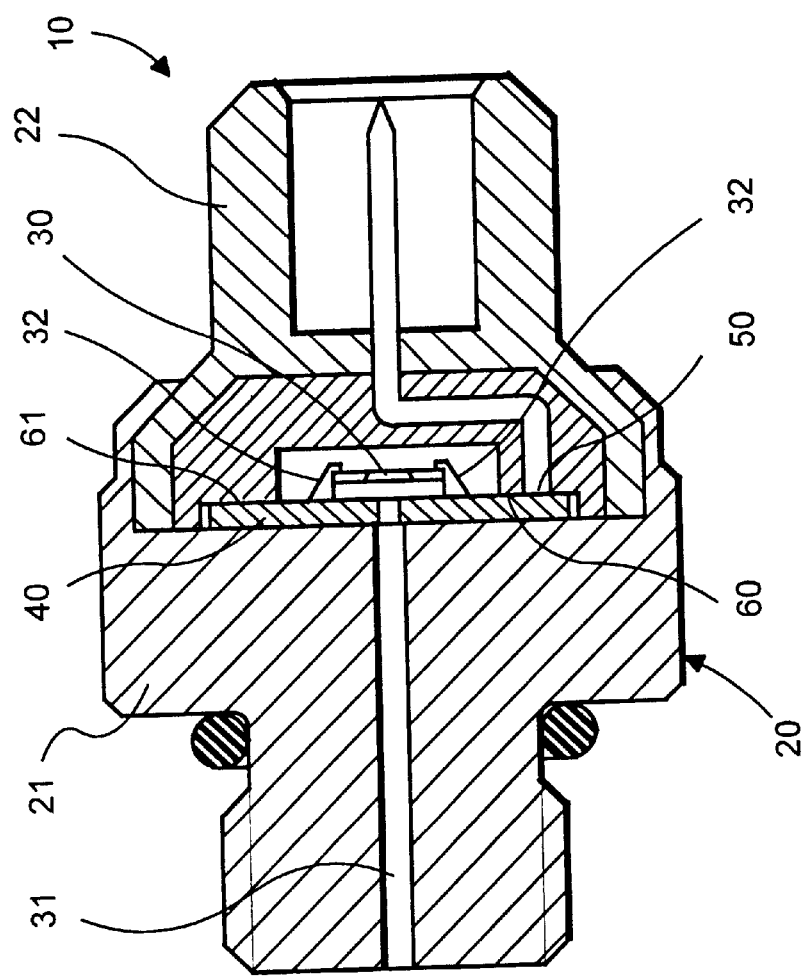
FIG. 1 shows a partly sectioned front and side view of a pressure sensor according to the present invention.
Figure 1B:
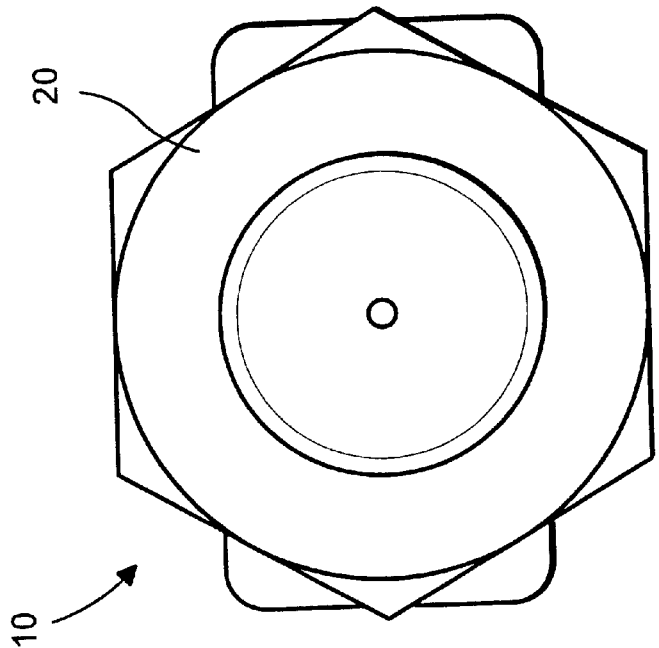
Figure 2B:
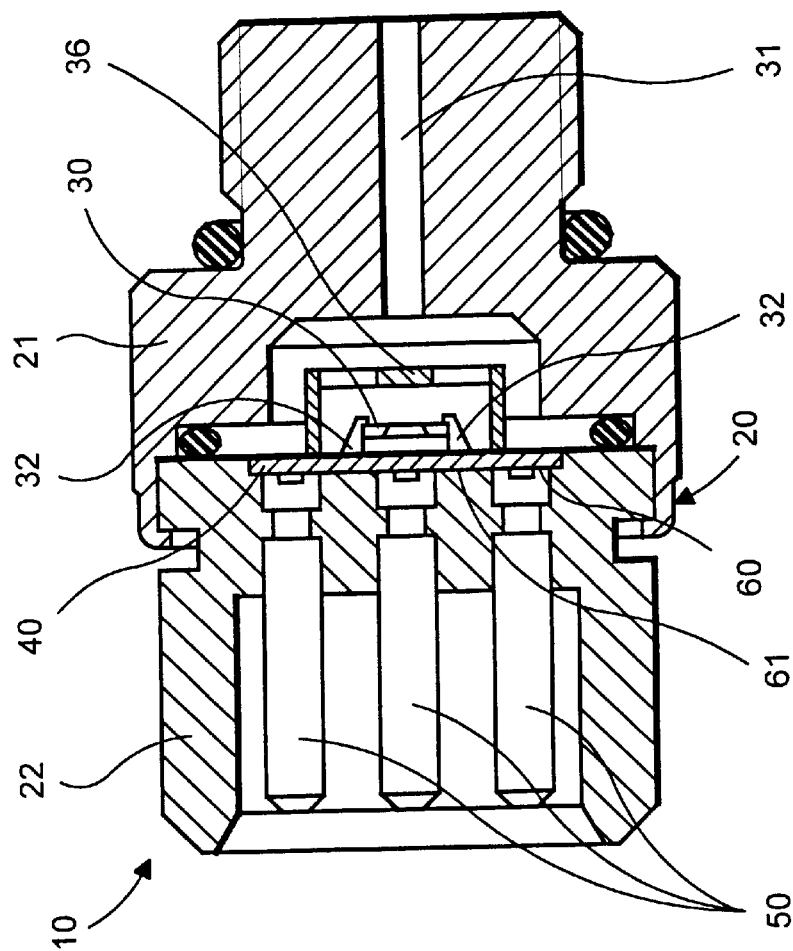
FIG. 2 shows a partly sectioned front and side view of another embodiment of a pressure sensor according to the present invention.
Figure 2A:
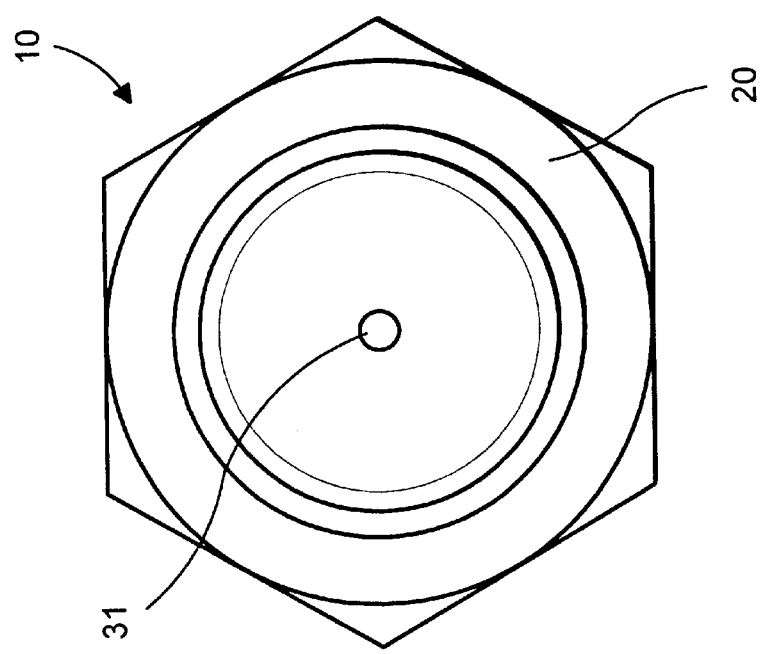

A pressure sensor, depicted in FIG. 1, FIG. 2, and FIG. 3 and labeled 10 in its entirety, comprises a housing 20 which, for example, comprises two housing halves 21, 22. Housing 20 has a substantially cylindrical shape and is preferably made of plastic. A sensor element 30 is arranged in housing 20. Sensor element 30 is connected to the environment via a tubular connection 31. A medium affected by pressure acts, via tubular connection 31, on sensor element 30, which is, for example, a silicon chip equipped with a diaphragm. Sensor element 30 is arranged on a support plate 40 and joined, for example by means of bonded wires 32, to contact surfaces (not depicted) on support plate 40. Sensor element 30 is protected from the medium affected by pressure, in particular from dust, dirt, and the like that may be present therein, by a membrane 35 (see FIG. 3) or a perforated protective cap 36 (see FIG. 2).

Further electrical/electronic components (not depicted) can be arranged in an electrical circuit arrangement on support plate 40, which is configured as a hybrid ceramic plate.

Connector elements 50, for example, in the form of plug contacts or solder lugs, are joined in electrically conductive fashion to support plate 40. As is evident in particular from FIGS. 2 and 3, contact elements 50 are in this context configured so that they lie flush with a mounting surface 60 configured in housing 20, so that the contact surfaces arranged on the support plate can be joined directly to connector elements 50 by means of an SMD joining method that is known per se.

The contact surfaces and contact elements 50 can, for example, be soldered to one another. Another type of join consists in an adhesive join using a conductive adhesive to produce and configure said adhesive join.

To increase the stability of the bond created in this fashion between contact elements 50 and the support plate, there is applied between support plate 40 and surface 60 a capillary adhesive 61 which on the one hand joins support plate 40 solidly to mounting surface 60, and on the other hand surrounds the electrically conductive joins between contact elements 50 and the contact surfaces, thus protecting them from environmental influences, in particular corrosion, oxidation, and the like.

The pressure sensor described above is produced by the fact that first the contact surfaces of support plate 40 are joined to connector elements 50. For example, to produce an adhesive join, a conductive adhesive is applied onto the contact surfaces of support plate 40. Support plate 40 is then attached to mounting surface 60 and to connector elements 50 by means of said conductive adhesive, and lastly a capillary adhesive 61 is applied in the resulting gap between support plate 40 and mounting surface 60 of the housing to form a sealing adhesive 61 join. Said capillary adhesive flows into the smallest pores between support plate 40 and mounting surface 60 of housing 20, thus not only producing a very solid, almost monolithic join between support plate 40 and housing 20, but also increasing the strength of the electrically conductive join between contact elements 50 and the contact surfaces of support plate 40, and protecting said contact elements 50 from environmental influences.

In order to prevent, in particular, any interruption in the conductive join between contact elements 50 and the contact surfaces of support plate 40 as a result of differing coefficients of thermal expansion in housing 20 and/or support plate 40 and/or the metal contact elements 50, housing 20 is preferably manufactured from a plastic whose coefficient of thermal expansion in at least one direction of mounting surface 60 corresponds substantially to the coefficient of thermal expansion of support plate 40 configured as a hybrid ceramic plate, so that in that plane, support plate 40 and housing 20 expand identically in response to temperature.

What is claimed is:

1. A pressure sensor, comprising:
   a housing having a mounting surface;
   a support plate having at least one contact surface, the support plate being arranged on the mounting surface;
   a sensor element arranged in the housing on the support plate;
   at least one connector element including a plurality of pins, an end of each one of the plurality of pins being directly connected to and electrically conductively joined to the at least one contact surface of the support plate, the at least one connector element being arranged flush with the mounting surface and being joined directly to the at least one contact surface; and
   a capillary adhesive layer arranged between the support plate and the mounting surface.

2. The pressure sensor according to claim 1, wherein the capillary adhesive layer surrounds an electrically conductive join between the at least one connector element and the at least one contact surface, and seals the electrically conductive join.

3. The pressure sensor according to claim 2, wherein the electrically conductive join is a solder join.

4. The pressure sensor according to claim 2, wherein the electrically conductive join is an adhesive join.

5. The pressure sensor according to claim 1, wherein the housing is a plastic housing, and wherein
   a coefficient of thermal expansion of the plastic housing corresponds in at least one direction of the mounting surface to a coefficient of thermal expansion of the support plate.

6. The pressure sensor according to claim 1, wherein the sensor element is arranged on the support plate.

7. The pressure sensor according to claim 1, wherein the support plate is a hybrid ceramic plate.

8. A method for manufacturing a pressure sensor, the pressure sensor including a housing having a mounting surface, a support plate arranged on the mounting surface and having at least one contact surface, a sensor element arranged in the housing on the support plate, and at least one connector element including a plurality of pins, the method comprising the steps of:
   electrically conductively joining and directly connecting the at least one contact surface to an end of each one of the plurality of pins of the at least one connector element arranged flush with the mounting surface; and
   applying a capillary adhesive between the support plate and the mounting surface to form a sealing adhesive join.

* * * * *